United States Patent
Thai et al.

(10) Patent No.: US 10,315,713 B2
(45) Date of Patent: Jun. 11, 2019

(54) SIDE SPLITTER AND SPLITTER ASSEMBLY WITH DIVE PLANE FEATURE

(71) Applicant: FORD GLOBAL TECHNOLOGIES, LLC, Dearborn, MI (US)

(72) Inventors: Peter Thai, White Lake, MI (US); Michael Stephen Sylvester, Berkley, MI (US); Thomas Joseph Ciccone, Madison Heights, MI (US); Andrew Thomas Cunningham, Royal Oak, MI (US); Matthew Arthur Titus, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 40 days.

(21) Appl. No.: 15/489,248

(22) Filed: Apr. 17, 2017

(65) Prior Publication Data

US 2018/0297649 A1   Oct. 18, 2018

(51) Int. Cl.
*B62D 35/00* (2006.01)
*B62D 37/02* (2006.01)
*B62D 35/02* (2006.01)

(52) U.S. Cl.
CPC ......... *B62D 35/008* (2013.01); *B62D 35/005* (2013.01); *B62D 35/02* (2013.01); *B62D 37/02* (2013.01); *Y02T 10/82* (2013.01)

(58) Field of Classification Search
CPC .... B62D 35/00; B62D 35/005; B62D 35/008; B62D 35/02
USPC ............................................ 296/180.1, 180.2
See application file for complete search history.

(56) References Cited

U.S. PATENT DOCUMENTS

| | | | |
|---|---|---|---|
| 6,712,425 B2 | 3/2004 | Brulhart | |
| 8,297,685 B2* | 10/2012 | Wolf | B62D 35/005 296/180.1 |
| 8,523,270 B2 | 9/2013 | Marlier et al. | |
| 9,327,775 B1 | 5/2016 | Guenzel | |
| 9,573,634 B2* | 2/2017 | Ohira | B62D 25/08 |
| 9,669,885 B1 | 6/2017 | Fahland et al. | |
| 2015/0079891 A1 | 3/2015 | Weiss et al. | |
| 2016/0339970 A1 | 11/2016 | Shibutake et al. | |
| 2017/0144636 A1* | 5/2017 | Schmidt | F16D 65/847 |

FOREIGN PATENT DOCUMENTS

| | | |
|---|---|---|
| JP | 2007015482 A | 1/2007 |
| JP | 2016150741 A | 8/2016 |
| KR | 101218083 B1 | 1/2013 |

OTHER PUBLICATIONS

English Machine Translation of JP2007015482A.
English Machine Translation of JP2016150741A.
English Machine Translation of KR101218083B1.
Non Final Office Action dated Jun. 29, 2018 for U.S. Appl. No. 15/489,156, filed Apr. 17, 2017.
Final Office Action dated Jan. 25, 2019 for U.S. Appl. No. 15/489,156, filed Apr. 17, 2017.

* cited by examiner

*Primary Examiner* — Jason S Daniels
(74) *Attorney, Agent, or Firm* — Jason Rogers; Vichit Chea; King & Schickli, PLLC

(57) ABSTRACT

A front splitter assembly includes a front splitter having a first end and a second end, a first side splitter at the first end and a second side splitter at the second end. Each side splitter includes a contoured body. Each side splitter includes a dive plane feature that increases generation of downforce at negligible drag cost.

14 Claims, 12 Drawing Sheets

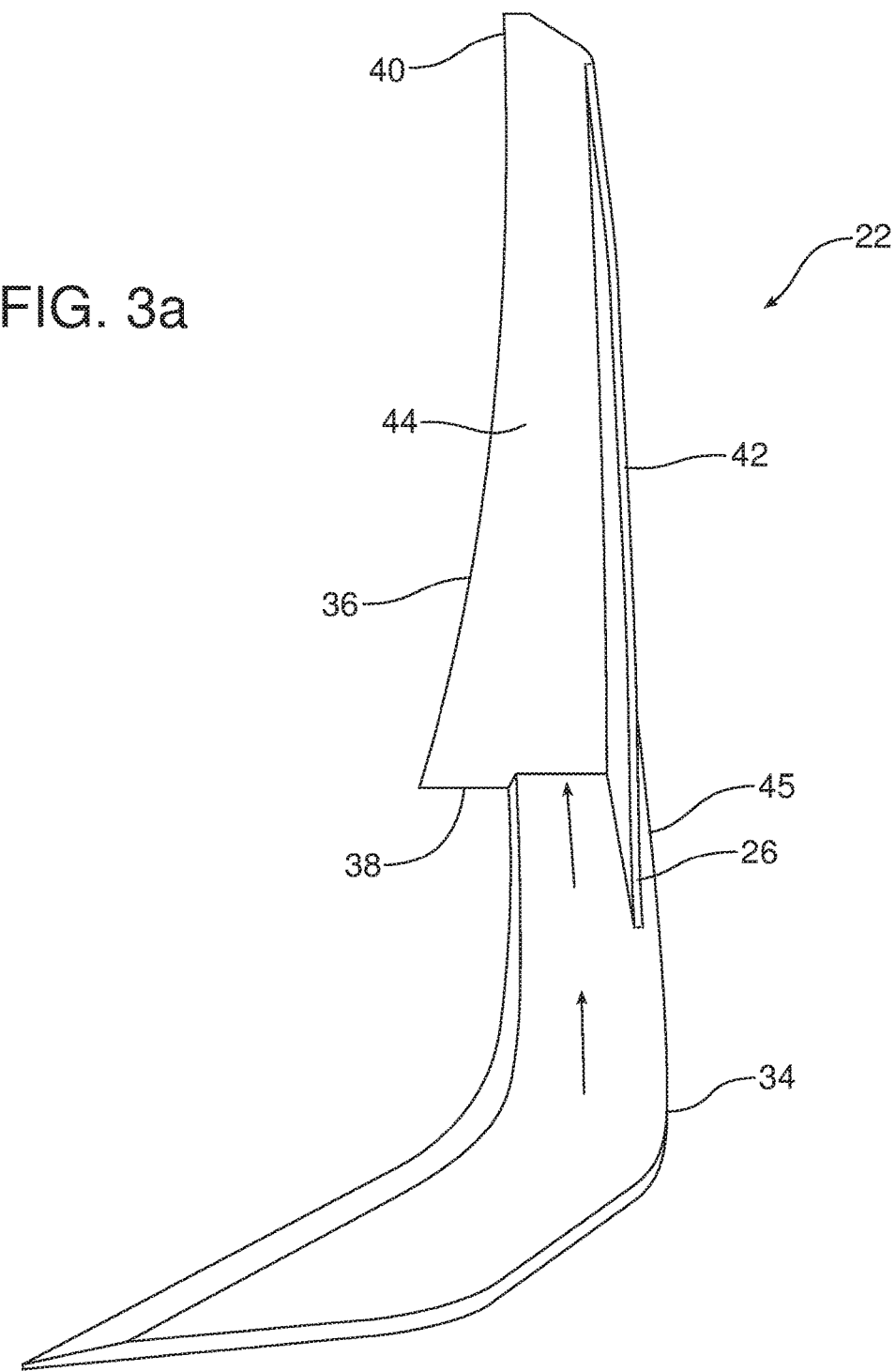

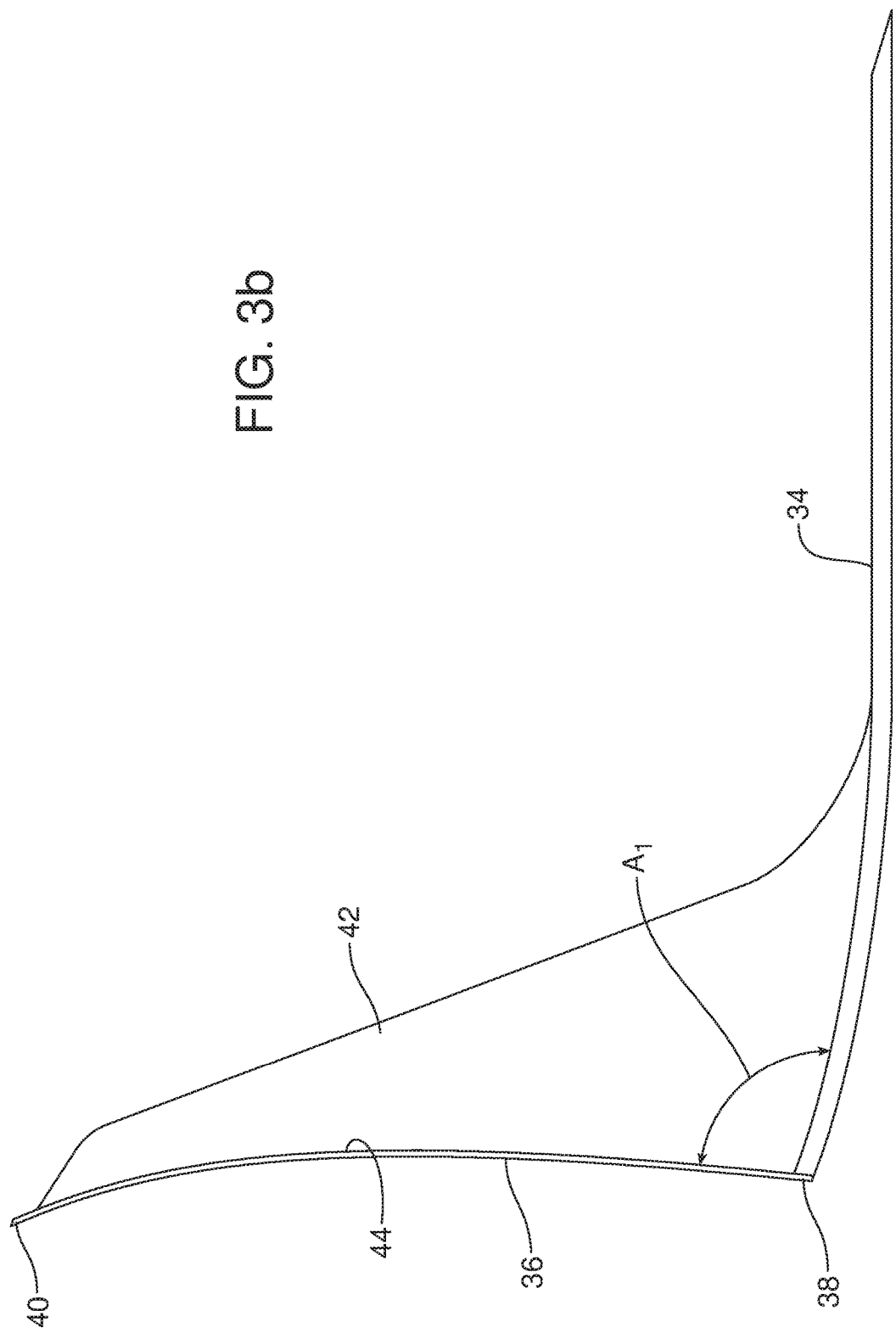

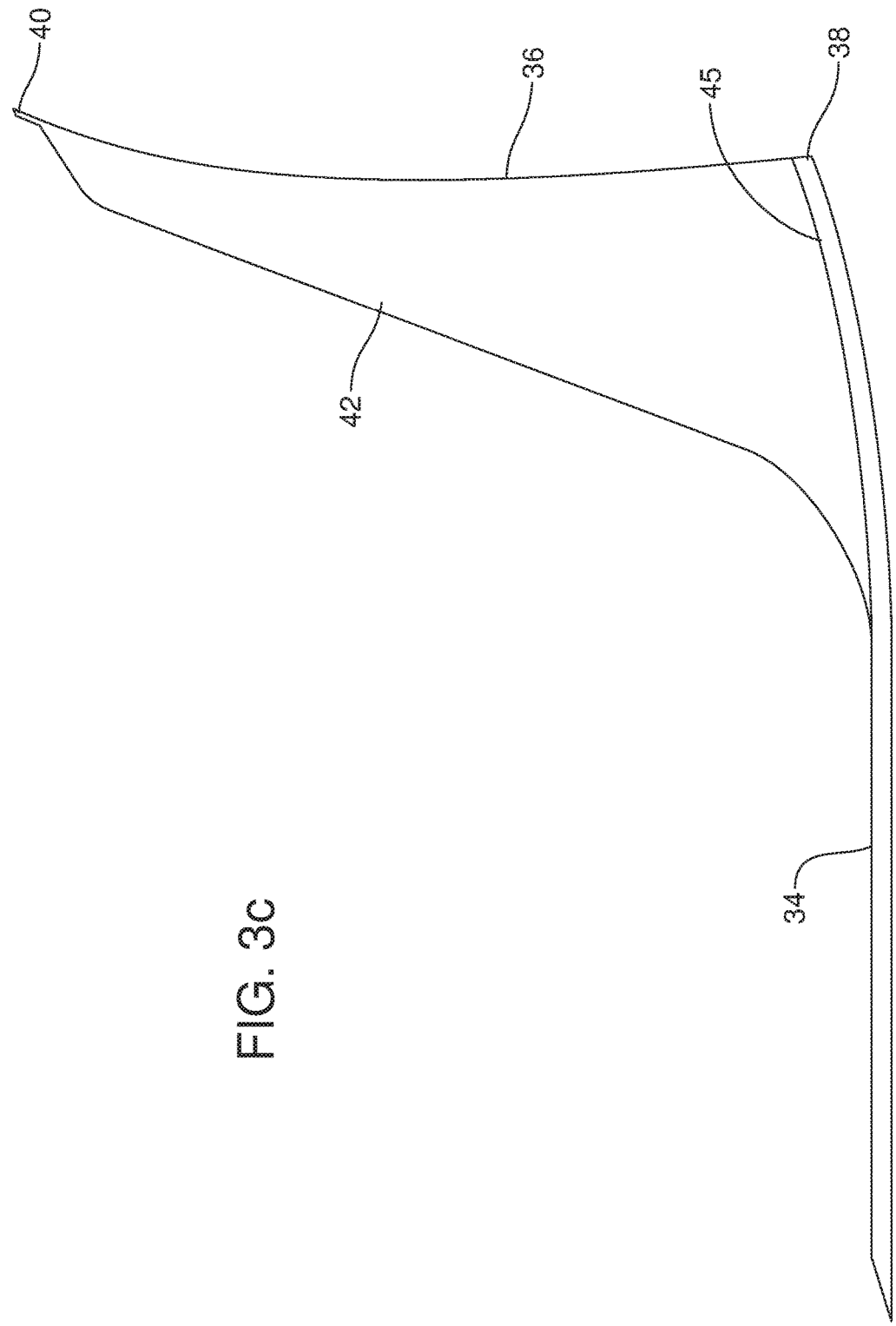

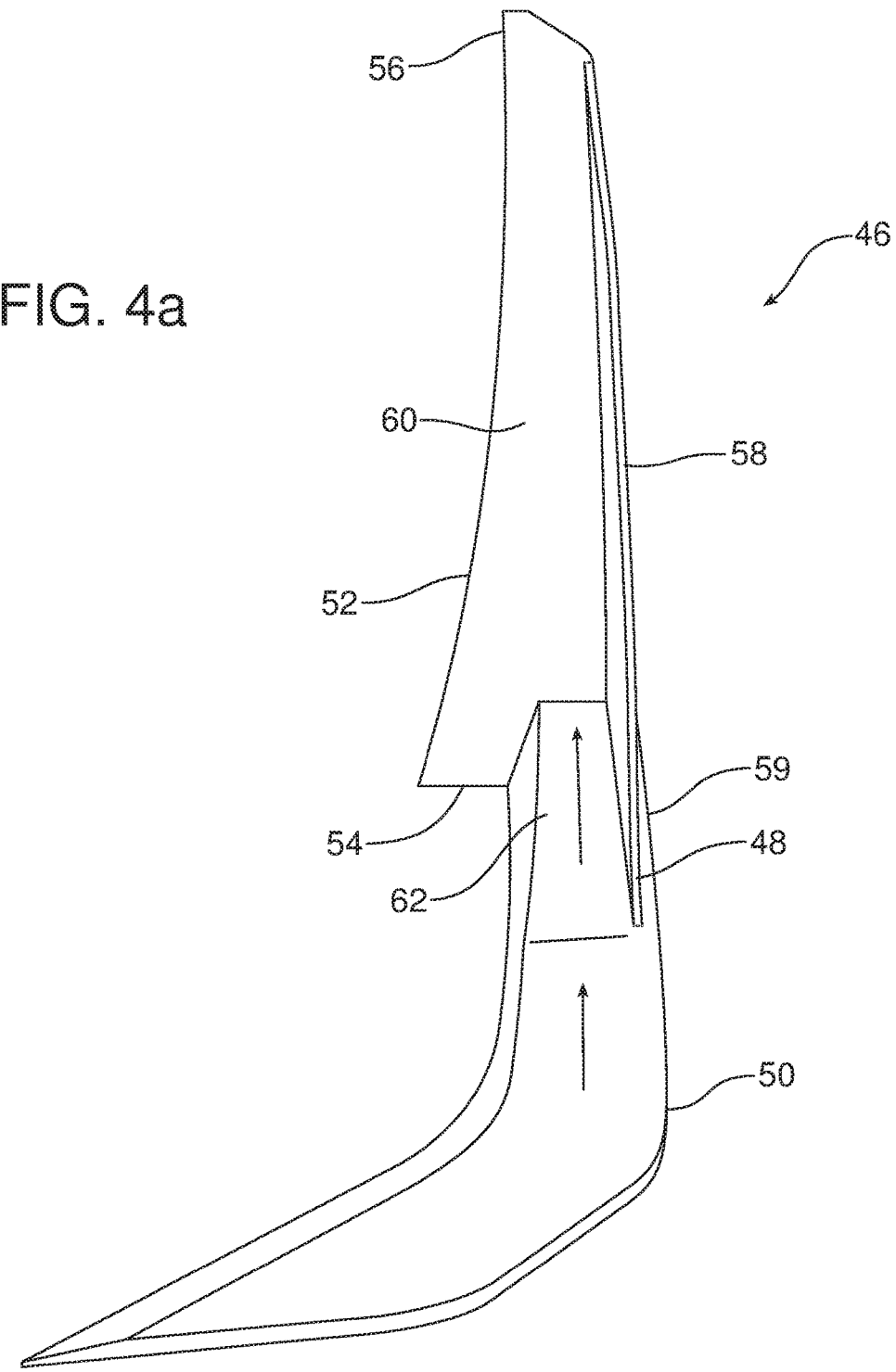

SIDE SPLITTER AND SPLITTER ASSEMBLY WITH DIVE PLANE FEATURE

TECHNICAL FIELD

This document relates generally to the motor vehicle equipment field and, more particularly, to a new and improved side splitter and a new and improved splitter assembly incorporating a dive plane feature for improving stability and peak cornering speed of a motor vehicle.

BACKGROUND

When a high performance motor vehicle is at a dynamic curb ride height, high pressure regions are generated on tire surfaces exposed to free-stream airflow. These include but are not necessarily limited to surfaces outboard of the front bumper fascia and below the underbody forward of the tire. These high pressure regions generate a positive lifting force acting upon the motor vehicle.

When the motor vehicle experiences a forward pitch through braking, throttle reduction and/or road inputs, the front nose or splitter of the performance vehicle moves toward the ground, increasing negative lift ("downforce"). The resulting rapid change in front tire grip in proportion to rear tire grip results in a phenomena of high pitch sensitivity that reduces vehicle stability, driver confidence and peak cornering speed.

Rapid changes in front tire grip may also be experienced at other times. For example, when a high performance motor vehicle is traveling in a direction different than its longitudinal axis ("yaw"), an increase in vehicle lift is experienced. More specifically, when the free stream air travels at an angle with respect to the longitudinal axis over the fascia, hood and other body components and into the wheel wells, lift is generated. The net effect is reduced vehicle stability, reduced driver confidence and reduced peak cornering speed.

This document relates to a new and improved side splitter and a new and improved splitter assembly incorporating a dive plane feature for improving stability and peak cornering speed of a motor vehicle.

SUMMARY

In accordance with the purposes and benefits described herein, a new and improved side splitter is provided for a motor vehicle. That side splitter comprises a contoured body including: (a) an extension section and a wicker section defining a first included angle of between 75 and 105 degrees, (b) an end plate outboard of the wicker section and (c) a dive plane feature outboard of the end plate. The end plate and the dive plane feature may form a second included angle of between 0 and 60 degrees.

The wicker section may extend upwardly and rearwardly from the extension section. Further, the wicker section may narrow from a first end adjacent the extension section toward a second, opposite end. The end plate may project forward from a front face of the wicker section. The dive plane feature may arc upwardly and rearwardly on the end plate. That arc may have a radius of curvature of between infinite (flat plane) and 50 mm. The arc may be constant or vary across the dive plane feature.

In some embodiments, the side splitter may include an underwing extending between the extension section and the wicker section inboard of the end plate. The underwing may form a third included angle of between 0.1 and 20 degrees with respect to the extension section and a fourth included angle of between 90 degrees and 135 degrees with respect to the wicker section. Further, the end plate and the front face of the wicker section may form a fifth included angle of between 75 degrees and 115 degrees.

In accordance with an additional aspect, a splitter assembly is provided for a motor vehicle. That splitter assembly comprises a front splitter having a first end and a second end, a first side splitter at the first end and a second side splitter at the second end wherein the first side splitter includes a first contoured body and the second side splitter includes a second contoured body.

The first contoured body may include: (a) an extension section and a wicker section defining a first included angle of between 75 and 105 degrees, (b) an end plate outboard of the wicker section and (c) a dive plane feature outboard of the end plate. The end plate and the dive plane feature may form a second included angle of between 0 and 60 degrees.

The wicker section may extend upwardly and rearwardly from the extension section. Further, the wicker section may narrow from a first end adjacent the extension section toward a second, opposite end. The dive plane feature may arc upwardly and rearwardly on the end plate. That arc may have a radius of curvature of between infinite (flat plane) and 50 mm. The arc may be constant or vary across the dive plane feature.

In some embodiments the splitter assembly may include an underwing extending between the extension section and the wicker section inboard of the end plate. The underwing may form a third included angle of between 0.1 and 20 degrees with respect to the extension section and a fourth included angle of between 90 and 135 degrees with respect to the wicker section. Further, the outer lip and the front face of the wicker section may form a fifth included angle of between 75 and 115 degrees.

The second side splitter may be a mirror image of the first side splitter.

In the following description, there are shown and described several preferred embodiments of the side splitter and the splitter assembly for improving stability and peak cornering speed of a motor vehicle. As it should be realized, the side splitter and the splitter assembly are capable of other, different embodiments and their several details are capable of modification in various, obvious aspects all without departing from the side splitter and the splitter assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the side splitter, splitter assembly and the method of improving stability and peak cornering speed of a motor vehicle and together with the description serve to explain certain principles thereof.

FIG. 3a is a detailed perspective view of the side splitter illustrated in FIG. 2.

FIG. 3b is a detailed inboard side elevational view of the side splitter illustrated in FIG. 3a.

FIG. 3c is a detailed outboard side elevational view of the side splitter illustrated in FIGS. 3a and 3b.

FIG. 4a is a perspective view of an alternative embodiment of a side splitter including an underwing.

FIG. 4b is a detailed inboard side elevational view of the side splitter illustrated in FIG. 4a.

Reference will now be made in detail to the present preferred embodiments of the side splitter and the splitter assembly, examples of which are illustrated in the accompanying drawing figures.

DETAILED DESCRIPTION

Figure 1:
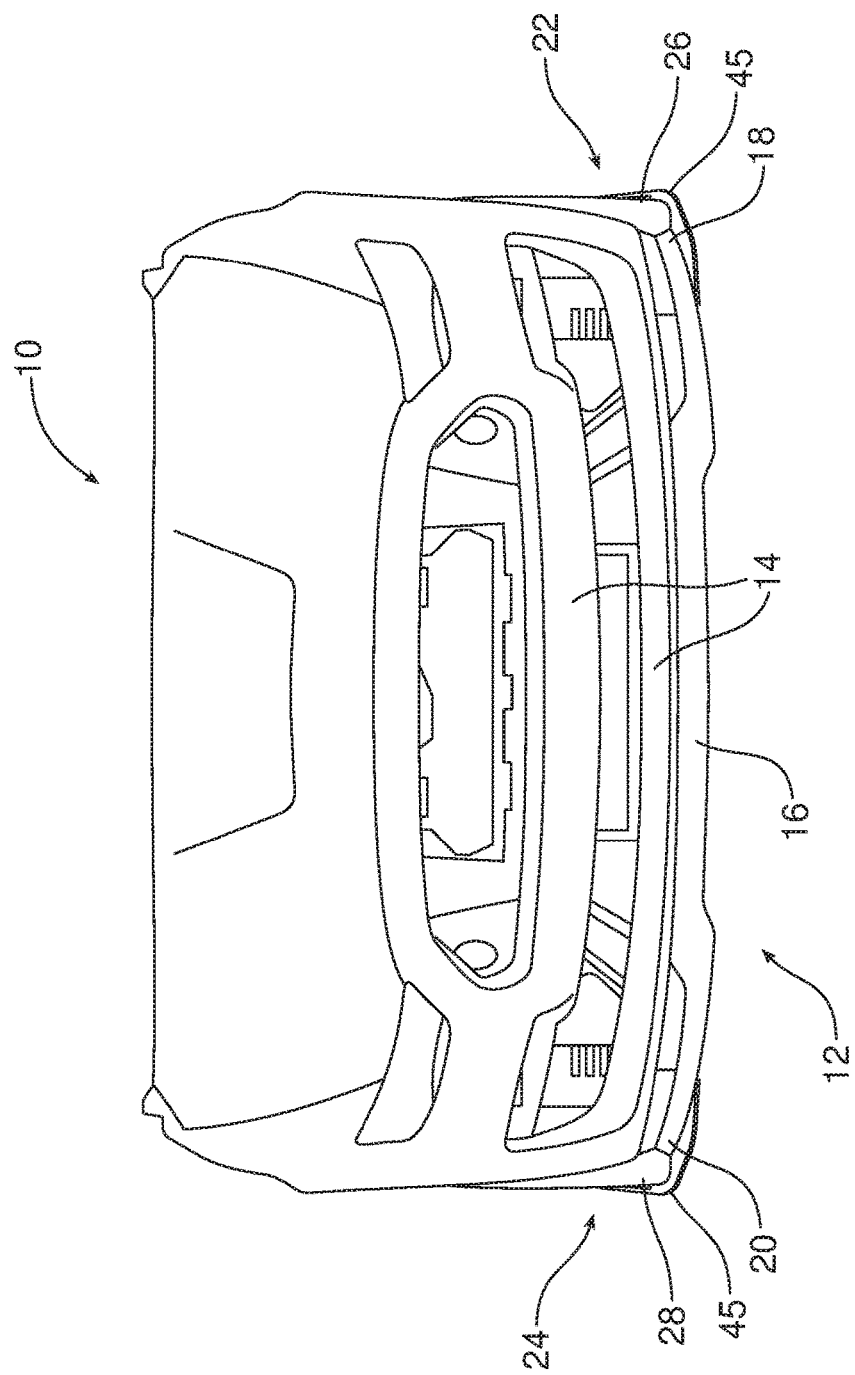
FIG. 1 is a front elevational view of a motor vehicle equipped with the new and improved splitter assembly.
Figure 2A:
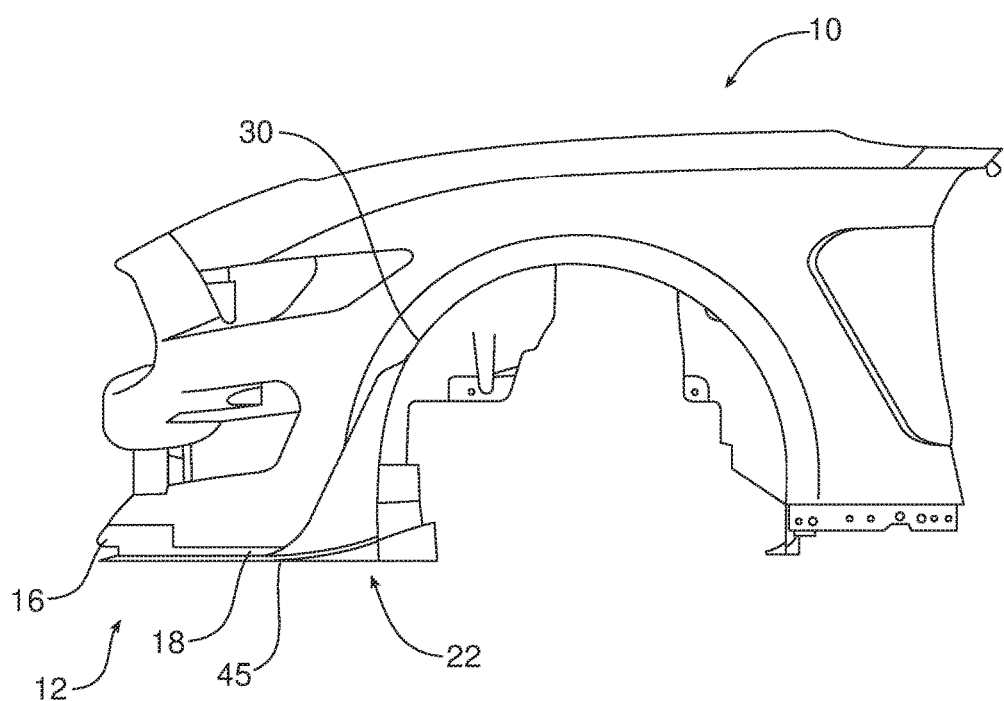
FIG. 2a is an end elevational view of a first side splitter of the splitter assembly illustrated in FIG. 1.
Figure 2B:
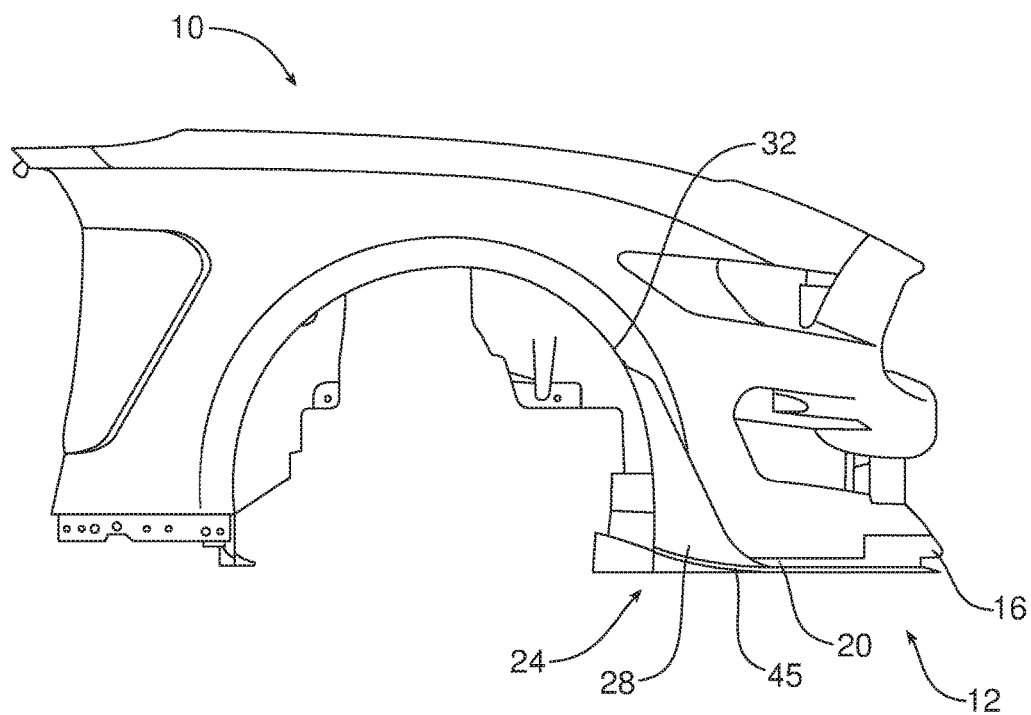
FIG. 2b is an end elevational view of a second side splitter at the opposite end of the splitter assembly.

Reference is now made to FIGS. 1, 2a and 2b illustrating a motor vehicle 10 equipped with the new and improved splitter assembly 12 outlining at least a portion of the front fascia 14 of the motor vehicle. More specifically, the splitter assembly 12 includes a front splitter 16 projecting downwardly from the front fascia 14. The front splitter 16 includes a first end 18 and a second end 20. A first side splitter 22 is provided at the first end 18 of the front splitter 16. A second side splitter 24 is provided at the second end 20 of the front splitter 16.

As illustrated, the first side splitter 22 includes a first contoured body 26 and the second side splitter 24 includes a second contoured body 28. As further illustrated in FIG. 2a, the first contoured body 26 of the first side splitter 22 extends from the first end 18 of the front splitter 16 to a first front wheel opening 30. Similarly, as illustrated in FIG. 2b, the second contoured body 28 of the second side splitter 24 extends from the second end 20 of the front splitter 16 to the second, opposite front wheel opening 32. As should also be appreciated from viewing FIG. 1, the first side splitter 22 and the second side splitter 24 extend beyond the fascia 14 of the motor vehicle 10.

Reference is now made to FIGS. 3a-3c which illustrate the first contoured body 26 of the first side splitter 22 in detail. More specifically, the first contoured body 26 includes an extension section 34 and a wicker section 36. The extension section 34 and the wicker section 36 typically define a first included angle $A_1$ of between 75 and 105 degrees. In some embodiments the first included angle $A_1$ is between 80 and 100 degrees. In some embodiments the first included angle $A_1$ is between 85 and 95 degrees. In still other embodiments, the first included angle $A_1$ is approximately 90 degrees.

As illustrated in FIGS. 1-5, the wicker section 36 extends upwardly and outwardly from the extension section 34. In some but not all of embodiments, the wicker section 36 narrows from a first end 38 adjacent the extensions section 34 toward a second, opposite end 40.

As illustrated in FIGS. 1, 2a and 3a-3c, end plate 42 is outboard of the wicker section 36. The end plate 42 projects forward from a front face 44 of the wicker section 36. A dive plane feature 45 is provided outboard of the end plate 42. As shown, the dive plane feature 45 arcs upwardly and rearwardly on the end plate 42 from the extension section 34. Here it should be appreciated that the second side splitter 24 is a mirror image of the first side splitter 22 described above and illustrated in detail in FIGS. 3a-3c.

FIGS. 4a-4e illustrate an alternative embodiment of side splitter 46 including a contoured body 48 similar in most respects to the contoured body 26 described above. Thus, the contoured body 48 includes an extension section 50 and a wicker section 52 defining a first included angle of between 75 and 105 degrees or between 80 and 100 degrees, or between 85 and 95 degrees or approximately 90 degrees.

The wicker section 52 extends upwardly and rearwardly from the extension section 50. In some embodiments the wicker section 52 narrows from a third end 54 adjacent the extension section 50 to a fourth, opposite end 56. Further, an end plate 58 is provided outboard of the wicker section 52. That end plate 58 projects forward from a front face 60 of the wicker section 52. The end plate 58 may have a height H of between about 5 mm and 750 mm and a width W of between about 5 mm and 200 mm. That width W may be constant or vary across the height H of the wicker section 52. This dimension could vary based upon fascia (bumper cover) location and how the splitter wicker is mounted.

A dive plane feature 59 is provided outboard of the end plate 58. As shown, the dive plane feature 59 arcs upwardly and rearwardly on the end plate 58 from the extension section 50. The end plate 58 and the dive plane feature 59 may form a second included angle $A_2$ of between 45 and 135 degrees. See FIG. 4e. Further, the dive plane feature 59 may have a radius of curvature of between infinite (flat plane) and 50 mm. That radius of curvature may be constant or vary. The dive plane feature 45 of the embodiment illustrated in FIGS. 3a-3c may form a similar included angle with the end plate 42 and may include a similar radius of curvature.

In contrast to the first embodiment of the side splitter 22 illustrated in FIGS. 3a-3c, the side splitter 46 illustrated in FIGS. 4a-4e includes an underwing 62, in the form of a wedge-shaped channel, extending between the extension section 50 and the wicker section 52 inboard the end plate 58. The underwing 62 may form a third included angle $A_3$ of between about 0.1 and 20 degrees with the extension section 50. In some embodiments the third included angle $A_3$ is between about 5 and 15 degrees. In some embodiments the third included angle $A_3$ is between about 10 and 15 degrees. In some embodiments the third included angle $A_3$ is about 10 degrees.

The underwing 62 may form a fourth included angle $A_4$ of between about 90 and 135 degrees with the wicker section 52. In some embodiments, the fourth included angle $A_4$ may be between about 95 and 130 degrees. In some embodiments the fourth included angle $A_4$ may be between about 95 and 115 degrees. In some embodiments the fourth included angle $A_4$ may be about 100 degrees.

The end plate 58 and the front face 60 of the wicker section 52 may form a fifth included angle $A_5$ of between about 75 and 115 degrees. In some embodiments, the fifth included angle $A_5$ is between about 80 and 110 degrees. In some embodiments, the fifth included angle $A_5$ is between about 85 and 105 degrees. In some embodiments, the fifth included angle $A_5$ is between about 85 and 95 degrees. In some embodiments, the fifth included angle $A_5$ is about 90 degrees. The end plate 42 and the front face 44 of the wicker section 36 of the side splitter 22 illustrated in FIGS. 3a-3c may form a similar included angle.

The side splitter 46 illustrated in FIGS. 4a-4e is adapted to be provided at the first end 18 of the front splitter 16. A second side splitter adapted for the second end 20 of the front splitter would be a mirror image of the side splitter 46 illustrated in FIGS. 4a-4e.

Consistent with the above description, a method is provided of improving stability and peak cornering speed of a motor vehicle 10. That method may be broadly described as comprising the steps of adding a first side splitter 22 to a first end 18 of a front splitter 16 and adding a second side splitter 24 to a second end 20 of the front splitter.

As further illustrated in FIGS. 1, 2a and 2b, the method may further include the step of extending the front splitter beyond the front fascia 14 of the motor vehicle at the first end 18 and the second end 20 by means of the extension sections 34 of the first and second side splitters 22, 24. In addition, the method includes providing wicker sections 36 extending upward and rearward at the first and second ends 18, 20 of the front splitter 16.

Still further, the method includes extending the wicker sections 36 of the first side splitter 22 from the first end 18 of the front splitter 16 to the first front wheel opening 30 and the second wicker section of the second side splitter 24 from the second end 20 of the front fascia to the second front wheel opening 32. Further, the method includes providing a dive plane feature 45 outboard of the end plate 42. The dive plane feature 45 is provided at a desirable attack angle (e.g. between 0 and 60 degrees with respect to the horizontal) that is particularly beneficial to increase the production of downforce (note action arrow D) at negligible drag cost. Thus, the dive plane feature 45 improves cornering stability with negligible loss of straightaway speed. The dive plane feature 59 on the side splitter 46 functions in the same manner.

Figure 4B:
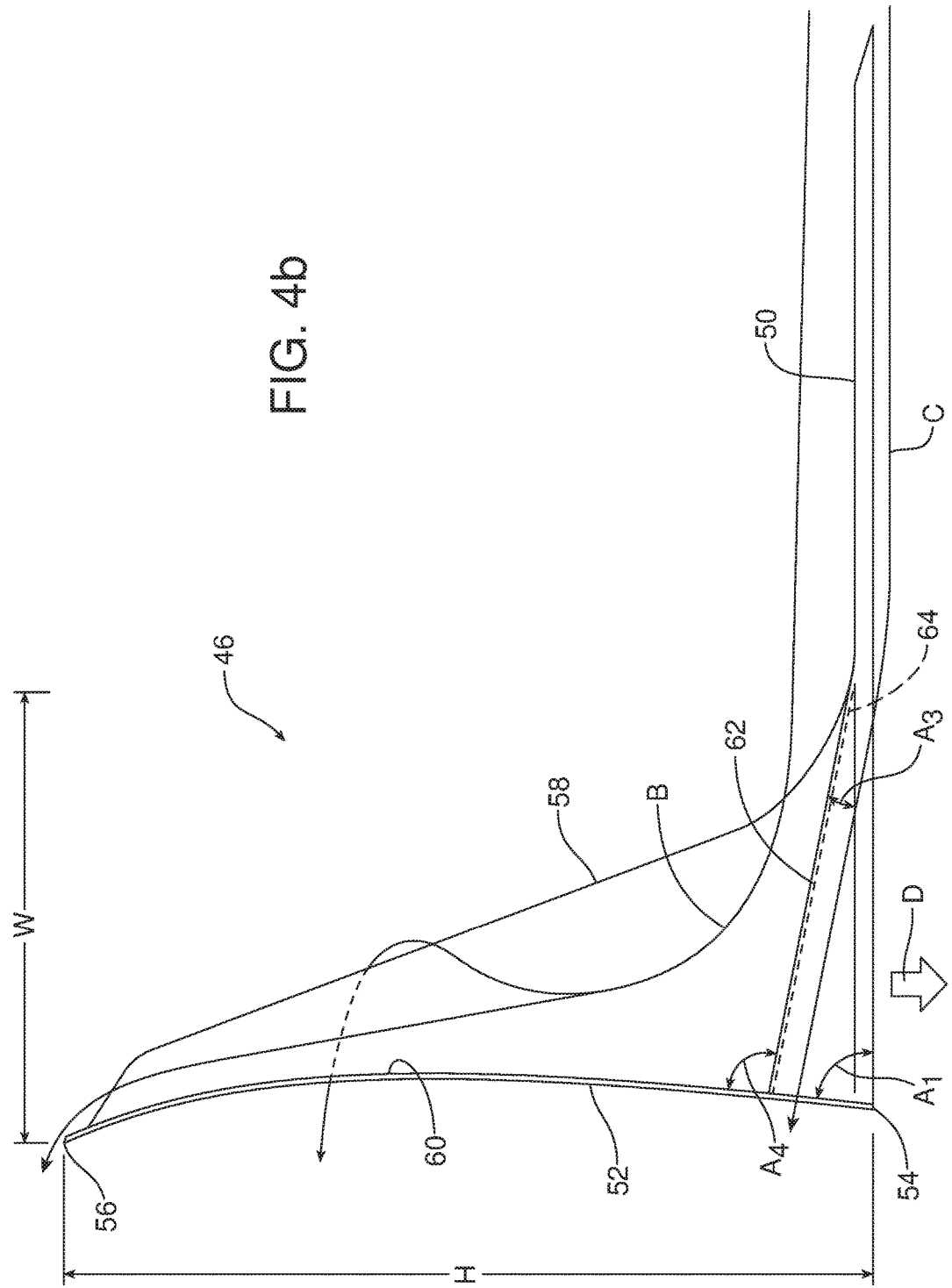
Figure 4C:
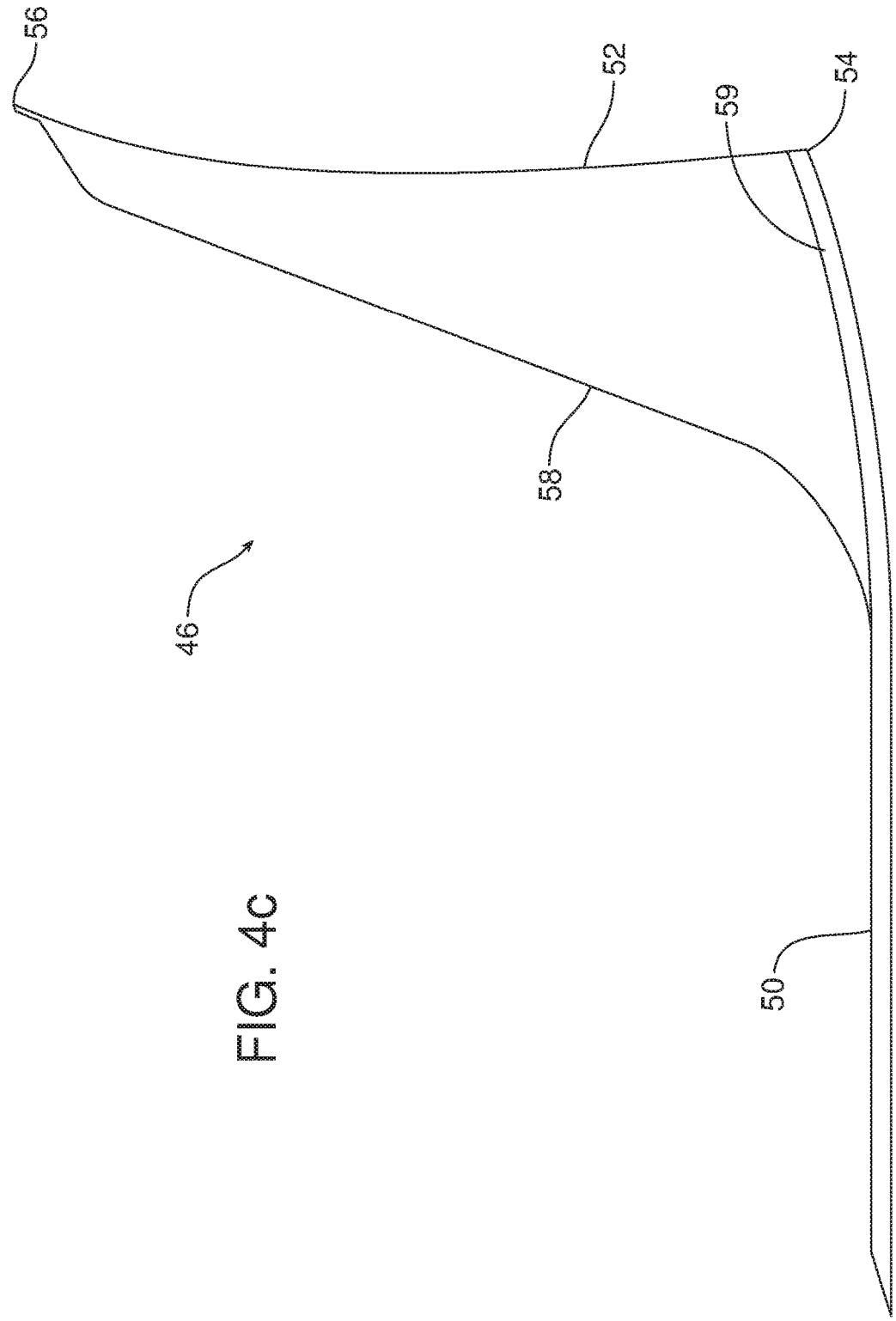
FIG. 4c is a detailed outboard side elevational view of the side splitter illustrated in FIGS. 4a and 4b.
Figure 4D:
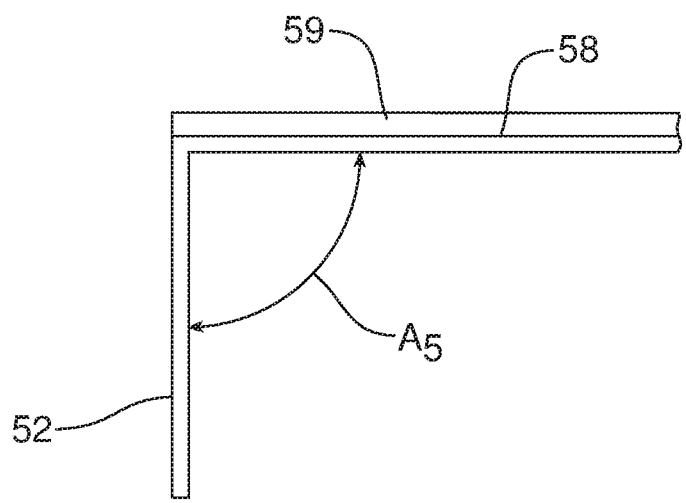
FIG. 4d is a top plan view of the side splitter illustrated in FIGS. 4a-4c showing the included angle formed between the wicker surface and the end plate.
Figure 4E:
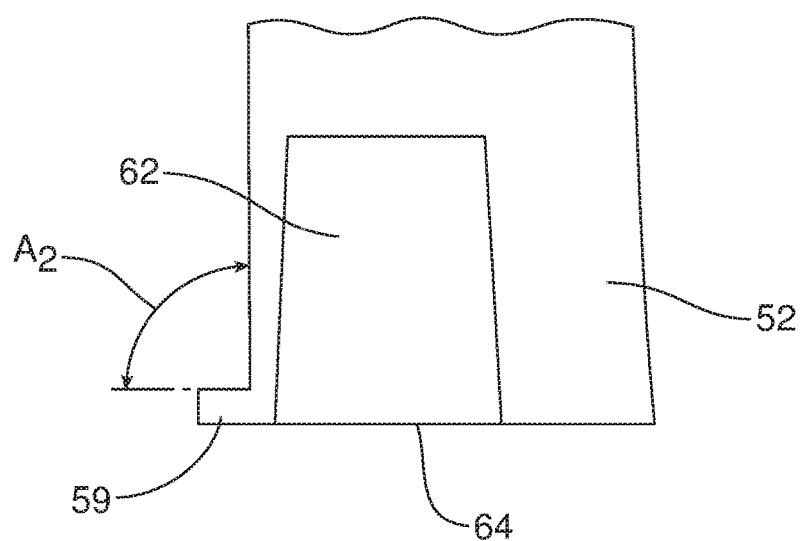
FIG. 4e is a detailed rear plan view illustrating the wedge-shaped channel of the underwing.

Still further, the method may include providing a first underwing 62 at a first base of the first wicker section 36 and providing a second underwing 62 at a second base of the second wicker section 52 of the second side splitter 46. FIG. 4b includes split action arrow B showing how the air stream flows over the side splitter 46 across the upper surface of the extension section 50, then upward over the underwing 62 and then upward again along the front face 60 of the wicker section 52. The forward projecting end plate 58 concentrates the air flow over the underwing 62 and the front face 60 while allowing some to spill around outboard of the end plate. The action arrow C illustrates the air flow along the undersurface of the side splitter 46 including through the wedge-shaped channel of the underwing 62 which allows the air to expand. This generates a low pressure area or zone beneath the starting edge 64 of the underwing 62 thereby creating desired downforce.

Similar to the dive plane feature 59, the underwing 62 located and extending between the extension section 50 and the wicker section 52 inboard of the end plate 58 and oriented at a desirable attack angle is particularly beneficial as it tends to increase production of downforce (note action arrow D) at negligible drag cost. Thus, it should be appreciated that such an underwing 62 also improves cornering stability with negligible loss of straightaway speed when compared to a substantially identical side splitter not including the underwing.

Figure 5:
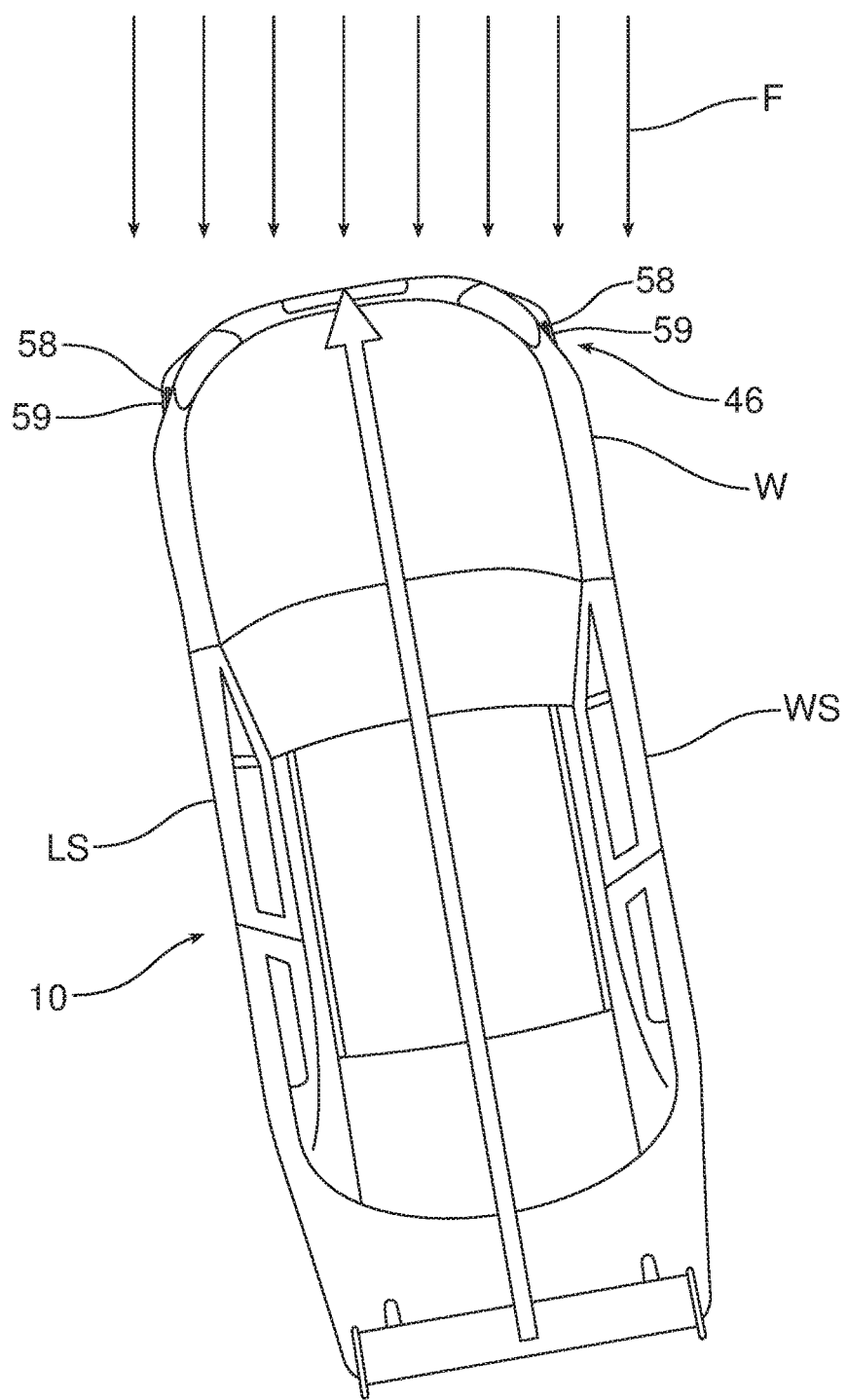
FIG. 5 is a top plan view of a motor vehicle illustrating yaw and wind flow.

In summary, the side splitter 22, 24, 46 provides a number of benefits and advantages. It projects outwardly and downwardly from the front fascia 14 reducing the exposure of the tires of the motor vehicle to free flow of air during cornering or even when the motor vehicle is at a yaw angle with respect to the longitudinal axis of the motor vehicle. As illustrated in FIG. 5, on the windward side WS, that is the side of the motor vehicle 10 incident to the free stream air F, the end plate 58 of the side splitter 46 reduces air flow into the wheel well W. On the leeward side LS, that is the side opposite the free stream air, the end plate 58 helps to stagnate the accelerated air flow wrapping around the fascia 14 and the bumper. Thus, increases in front lift are minimized, improving vehicle stability, driver confidence and peak cornering speed.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A side splitter, comprising:
a contoured body including (a) an extension section and a wicker section defining a first included angle of between 75 and 105 degrees, (b) an end plate outboard of said wicker section and (c) a dive plane feature outboard of said end plate wherein said end plate and said dive plane feature form a second included angle of between 0 and 60 degree and said wicker section extends upwardly and rearwardly from said extension section and said dive plane feature arcs upwardly and rearwardly on said end plate.

2. The side splitter of claim 1, wherein said dive plane feature has a radius of curvature of between infinite (flat plane) and 50 mm.

3. The side splitter of claim 2, wherein said wicker section narrows from a first end adjacent said extension section toward a second, opposite end and said end plate projects forward from a front face of said wicker section.

4. The side splitter of claim 3, further including an underwing extending between said extension section and said wicker section inboard of said end plate.

5. The side splitter of claim 4, wherein said underwing forms a third included angle of between 0.1 and 20 degrees with said extension section and a fourth included angle of between 90 and 135 degrees with said wicker section.

6. The side splitter of claim 5, wherein said end plate and said front face of said wicker section form a fifth included angle of between 75 and 115 degrees.

7. A splitter assembly for a motor vehicle, comprising:
a front splitter having a first end and a second end;
a first side splitter at said first end; and
a second side splitter at said second end;
said splitter assembly being characterized by said first side splitter including a first contoured body having (a) an extension section and a wicker section defining a first included angle of between 75 and 105 degrees, (b) an end plate outboard of said wicker section and (c) a dive plane feature outboard of said end plate wherein said end plate and said dive plane feature form a second included angle of between 45 and 135 degrees and said wicker section extends upwardly and rearwardly from said extension section and said dive plane feature arcs upwardly and rearwardly on said end plate.

8. The splitter assembly of claim 7, wherein said dive plane feature has a radius of curvature of between infinite (flat plane) and 50 mm.

9. The splitter assembly of claim 8, wherein said wicker section narrows from a third end adjacent said extension section toward a fourth, opposite end and said end plate projects forward from a front face of said wicker section.

10. The splitter assembly of claim 9, wherein said dive plane feature is provided on said end plate at said third end of said wicker section.

11. The splitter assembly of claim 10, further including an underwing extending between said extension section and said wicker section inboard of said end plate.

12. The splitter assembly of claim 11, wherein said underwing forms a third included angle of between 0.1 and 20 degrees with said extension section and a fourth included angle of between 90 and 135 degrees with said wicker section.

13. The splitter assembly of claim 12, wherein said end plate and said front face of said wicker section form a fifth included angle of between 75 and 115 degrees.

14. The splitter assembly of claim 13, wherein said second side splitter has a second contoured body that is a mirror image of said first contoured body.

* * * * *